(12) United States Patent
Kruegel et al.

(10) Patent No.: US 8,059,817 B2
(45) Date of Patent: Nov. 15, 2011

(54) METHOD AND APPARATUS FOR ENCRYPTED COMMUNICATIONS USING IPSEC KEYS

(75) Inventors: Chris A. Kruegel, Plainfield, IL (US); Michael W. Bright, Arlington Heights, IL (US); Dipendra M. Chowdhary, Hoffman Estates, IL (US); Thomas J. Senese, Schaumburg, IL (US); Timothy G. Woodward, Tempe, AZ (US); Larry Murrill, Schaumburg, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 949 days.

(21) Appl. No.: 11/765,085

(22) Filed: Jun. 19, 2007

(65) Prior Publication Data

US 2008/0019525 A1    Jan. 24, 2008

Related U.S. Application Data

(60) Provisional application No. 60/805,340, filed on Jun. 20, 2006.

(51) Int. Cl.
*H04L 9/00* (2006.01)
*H04L 9/32* (2006.01)
*G06F 7/04* (2006.01)

(52) U.S. Cl. ........ 380/273; 713/169; 713/170; 713/171; 726/2; 726/3; 726/4; 726/5; 726/6

(58) Field of Classification Search .................... 380/273
See application file for complete search history.

(56) References Cited

U.S. PATENT DOCUMENTS

| | | |
|---|---|---|
| 6,330,562 B1 | 12/2001 | Boden |
| 2003/0196081 A1 | 10/2003 | Savarda |
| 2006/0005012 A1 | 1/2006 | Deshpande |

OTHER PUBLICATIONS

PCT International Search Report Dated Jul. 16, 2008.
Australian Rejection for Counterpart Application Dated Dec. 8, 2009.
Australian Notice of Acceptance Dated Apr. 7, 2010.
Australian Letters Patent Dated Aug. 5, 2010.
Mexico Notice of Issuance for Counterpart Application Dated Oct. 1, 2010.
China Rejection for Counterpart Application Dated Oct. 8, 2010.
RFC 4301; Network Working Group; S. Kent, et al. "Security Architecture for the Internet Protocol", Dec. 2005; pp. 11-61.
TIA Standard; TIA-102.Aacb, Nov. 19, 2002; Project 25-Over the Air Rekeying (OTAR) Operational Description, pp. 8-12.
TIA/EIA Standard; Tiaeia-102.AACA, Apr. 12, 2001; Project 25-Digital Radio Over the Air Rekeying (OTAR) Protocol; Sections 6.1 (pp. 13-17); 7 (pp. 29-31); Annex a (pp. 41-73) and Annex B (pp. 75-146).

*Primary Examiner* — Longbit Chai
(74) *Attorney, Agent, or Firm* — Indira Saladi; Valerie M. Davis

(57) ABSTRACT

Disclosed is a method for encrypted communications. A first IPsec endpoint selects a security association (SA) from a security association database (SAD) by using a selector and then extracts an indexing parameter from SA. The indexing parameter is used to determine an active key location from a key storage database (KSD). Data packets are then encrypted using a key from the active key location. The first IPsec endpoint also forms a security parameter index (SPI) in a header of the data packet by using a keyID from the active key location and transmits the encrypted data packet with the header indicating the SPI to a second IPsec endpoint.

20 Claims, 6 Drawing Sheets

(A)

| SPD | | |
|---|---|---|
| SOURCE ADDRESS | DESTINATION ADDRESS | POLICY |
| $A_1$ | $A_2$ | PROCESS |
| $A_3$ | $A_4$ | PROCESS |
| $A_5$ | $A_6$ | BYPASS |
| $A_7$ | $A_8$ | DISCARD |

(B) 202

| SAD | | | | | |
|---|---|---|---|---|---|
| SA | SOURCE ADDRESS | DESTINATION ADDRESS | SPI | $SPI_S$ | MODE |
| SA1 | $A_1$ | $A_2$ | [21,42] | $SLN_2, SLN_4$ | TUNNEL |
| SA2 | $A_3$ | $A_4$ | [31,41] | $SLN_3, SLN_4$ | TRANSPORT |

(C)

| SA | SLN |
|---|---|
| 2 | 1000 |
|  |  |
|  |  |

(D)

| SLN | SPI | KEYID/ ALGID |
|---|---|---|
| 1000 |  |  |
|  |  |  |
|  |  |  |

(E)

| KSD | | |
|---|---|---|
| SLN | KEYSET1 | KEYSET2 |
| $SLN_1$ | 11 | 12 |
| $SLN_2$ | 21 | 22 |
| $SLN_3$ | 31 | 32 |
| $SLN_4$ | 41 | 42 |

*FIG. 2*

METHOD AND APPARATUS FOR ENCRYPTED COMMUNICATIONS USING IPSEC KEYS

CROSS REFERENCE TO RELATED APPLICATIONS

The present application claims the benefit of U.S. provisional application No. 60/805,340, entitled "Method and Apparatus for Management of IPsec Keys in an Encrypted Communications System," filed on 20 Jun. 2006 and assigned to Motorola, Inc. which is hereby incorporated by reference as if fully set forth.

FIELD OF THE INVENTION

The present invention relates generally to encrypted communications systems and more particularly to encrypted communications using IPsec keys.

BACKGROUND

Encrypted communications systems are well known. Many of these systems provide secure communications between two or more users by sharing one piece of information between the users, which permits only those users knowing the shared information to properly decrypt a message. The shared information is known as an encryption key variable, or key for short. Loading this key into an encryption device in a communications unit is a basic requirement that allows secure communications to occur. To retain security over a long period of time, the keys are changed periodically, typically weekly or monthly.

Loading new keys, called rekeying, can be done in various ways. Over-the-air rekeying is achieved by transmitting the keys from a central site to communications units over a typical secure channel. Manual rekeying is accomplished by connecting a cable from a hand-held device (also called a key variable loader, or keyloader for short) to the communications unit and downloading the keys from the keyloader into the communications unit. Over-the-air rekeying takes a few seconds, and the process involved in manual rekeying, including locating the unit, connecting the loader, etc., takes much longer.

Thus, the use of over-the-air rekeying is a big timesaver and a security improvement when rekeying a large communications system. As systems grow larger, with thousands of communications units in one system, the need for multiple keys becomes evident. In secure RF trunked systems, such as the communications system described in U.S. Pat. No. 4,882,751, it is often likely that different groups within a large system require their own key or keys, possibly to increase internal security or to minimize the number of times it is necessary to reload keys over a period of time.

In a situation where IPsec is also implemented, over-the-air rekeying must work alongside with IPsec. As is known, IPsec is defined in RFC 4301 and is recognized by the industry as an application to encrypt and/or authenticate data traffic at the IP level. There are two general methods for IPsec key management: manual key and derived key. Manual key involves the use of static symmetric keys in communications units at both a source and destination. Derived key involves having both endpoints generate a common session key, e.g. using a Diffe-Helman exchange, followed by the mutual authentication of both endpoints. The methods for derived key management are defined under the public Internet Key Exchange (IKE) (as defined in RFC 4306) guidelines. The IKE exchange for key derivation and mutual authentication consists of several messages. Due to performance issues, it is undesirable to conduct an IKE exchange in certain communications systems, e.g. in a communications system adhering to APCO Project 25 (Project 25 for short).

For Project 25, key management is preferably performed using static symmetric keys and sending the static symmetric keys over the air. Such key management is specified in TIA102.AACA and TIA102.AACB and is termed over-the-air-rekeying (OTAR). Using OTAR has a number of advantages. For example, OTAR allows for defining crypto periods where new key material is used. OTAR also identifies the use of indices, or keysets, to enable a communications unit the flexibility of using keys for either an old crypto period or a new crypto period. Using keysets enables the communications units to maintain continuous communication through a crypto period changeover, even if the communications units are not all synchronized to the same crypto period. IPsec manual key management does not provide these benefits, e.g. allowing for continuous operation through crypto period changeovers (i.e. using keysets). Nor does IPsec define interoperation with Project 25 OTAR key management.

Accordingly, there exists a need for a new method and apparatus for encrypted communications using IPsec keys.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 2A illustrates an example of a security policy database (SPD) in accordance with some embodiments of the present invention;

FIG. 2B illustrates an example of a security association database (SAD) in accordance with some embodiments of the present invention;

FIG. 2C illustrates an example of a security association—storage location number (SA-SLN) table in accordance with some embodiments of the present invention;

FIG. 2D illustrates an example of a storage location number—security parameter index (SLN-SPI) table in accordance with some embodiments of the present invention;

FIG. 2E illustrates an example of a key storage database (KSD) in accordance with some embodiments of the present invention;

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

Generally speaking, pursuant to these various embodiments, disclosed is encrypted communications using IPsec keys.

Figure 1:
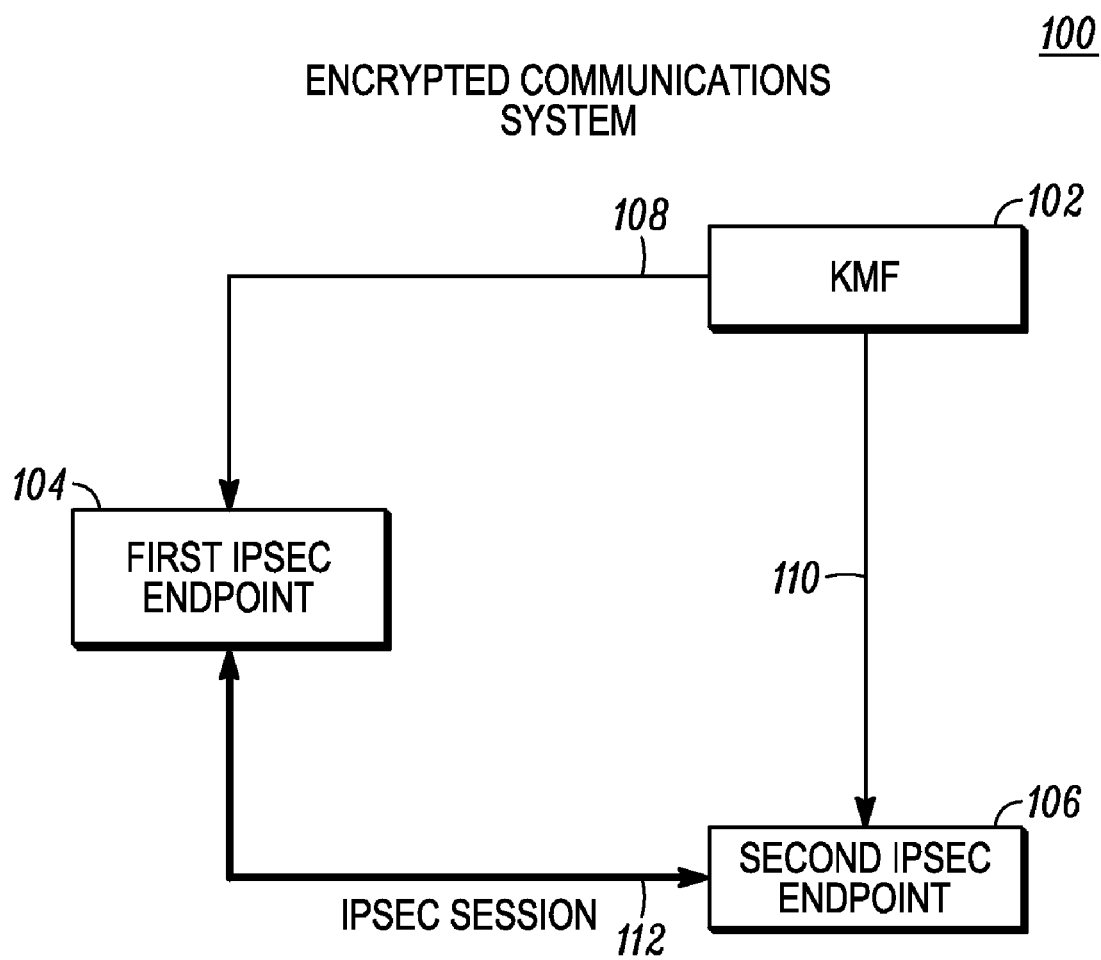
FIG. 1 is a block diagram illustrating an encrypted communications system in accordance with some embodiments of the present invention.

These and other benefits may become clearer upon making a thorough review and study of the following detailed description. Referring now to the drawings, and in particular to FIG. 1, the encrypted communications system 100 includes a Key Management Facility (KMF) 102, a first IPsec endpoint 104, and a second IPsec endpoint 106 so that the KMF 102 communicates via a first communications channel 108 to the first IPsec endpoint 104 and via a second communications channel 110 to the second IPsec endpoint 106 so that an IPsec session 112 is established between the two IPsec endpoints 104, 106. In one embodiment, the encrypted communications system 100 utilizes over-the-air rekeying (OTAR) over communications channel 108 for performing key management. In such an example, the encrypted communications system 100 is referred to as an OTAR system. TIA102.AACA and TIA102.AACB specify the details relating to a protocol (termed the OTAR protocol) used in the OTAR system.

The KMF 102 is a central control point for storing and distributing data relating to IPsec endpoints 104,106 to facilitate encrypted communications in the encrypted communications system 100. As such, the KMF 102 includes a database that records data. In one embodiment, the type of data that the KMF 102 stores includes IPsec endpoint IDs and keys. The KMF also has knowledge of data such as storage location numbers (SLNs) where a SLN defines a relationship between the keys and a security association (SA). In one embodiment, the SLN is defined in TIA 102.AACA. Having such data, the KMF 102 then transfers this data across communication channels 108, 110 to IPsec endpoints 104, 106.

Each IPsec endpoint 104, 106 is a communications device which can securely communicate with another communications device using a security protocol. Examples of security protocol include encapsulation security protocol (ESP) and authentication header (AH) protocol. The IPsec endpoints 104, 106 are also capable of performing encrypted communications. Each IPsec endpoint 104, 106 may comprise a keypad and/or key interface for entry of instructions and/or keys. Each IPsec endpoint may also comprise an interface for receiving instructions and/or keys from a remote entity, e.g. KMF 102. Regardless of how keys are communicated to each IPsec endpoint 104, 106, each IPsec endpoint 104, 106 stores information, e.g. customer options, keys, and associated key information (e.g. keyIDs), in a key storage database (KSD) of the IPsec endpoint.

Even though both IPsec endpoints 104, 106 may be mobile, portable, or fixed devices, as described herein, the first IPsec endpoint 104 is a mobile radio or a portable radio and the second IPsec endpoint 106 is a fixed device. Examples of a fixed device are a base station, a zone controller, a data controller, or other IPsec capable infrastructure device. Each mobile IPsec endpoint, e.g. 104, comprises a transmitter and a receiver to modulate and demodulate data to and from communications channel 108. As such, examples of a mobile IPsec endpoint are a mobile radio, such as an Astro Spectra with OTAR/multikey option, or a portable radio, such as an Astro XTS3500 with OTAR/multikey option. All are available from Motorola, Inc.

The communications channel 108 allows secure communications to take place between the KMF 102 and the first IPsec endpoint 104. In one embodiment, the communications channel 108 is a wireless radio frequency (RF) communications channel that provides signaling and data to mobile IPsec endpoint 104. As mentioned above, in one embodiment, the OTAR protocol is used over communications channel 108 for performing key management of keys in the encrypted communications system 100.

The communications channel 110 allows secure communications to take place between the KMF 102 and the second IPsec endpoint 106. In one embodiment, the communications channel 110 is a wired communications channel that communicates with fixed IPsec endpoint 106. As such, the wired communications channel may be an Ethernet connection. In any case, the first IPsec endpoint 104 and the second IPsec endpoint 106 communicate securely by establishing an IPsec session 112 between them. As used herein, an IPsec session 112 is defined as a secure communication that provides encryption and/or authentication of data packets.

In operation, encrypted communications in the encrypted communications system occurs by first rekeying the IPsec endpoints 104, 106. In one embodiment, rekeying is performed by, e.g. a system operator, sending a rekeying message from the KMF 102 over the communications channel 108 to the first IPsec endpoint 104. In one embodiment, the rekeying message comprises the keys for the SLNs. In one embodiment, the rekeying message also comprises a security parameter index (SPI). The KMF 102 may assign a random number to the SPI so that the IPsec endpoint receiving the SPI can associate the SPI to an SLN. In one embodiment, each SLN may be associated with up to 16 SPIs. In such an embodiment, 16 keysets are defined in TIA 102.AACA and relate to the 16 SPIs.

Rekeying of an IPsec endpoint can also be performed using a key variable loader (KVL). In such an embodiment, the KVL is directly connected to the IPsec endpoint to download keys and key information into the IPsec endpoint. In other embodiments the KVL can be used as a proxy for sending the rekeying message to the first IPsec endpoint 104. In alternative embodiments, rekeying of the IPsec endpoint can also be performed by the first IPsec endpoint 104 downloading keys and key information from other IPsec endpoints and/or communication units (not shown). Regardless of how rekeying of a mobile IPsec endpoint, e.g. 104, is performed, the KMF 102 also transfers the information found in the rekeying message to the fixed IPsec endpoint, e.g. 106, so that the fixed IPsec endpoint has knowledge of keys necessary for secure communications with the mobile IPsec endpoint.

Turning now to FIG. 2, shown are various storage elements found in an IPsec endpoint, e.g. 104, 106, where the storage elements facilitate encrypted communications in the encrypted communications system. A security policy database (SPD), a security association database (SAD), a security association—slot location numbers (SA-SLN) table, and a storage location number—security parameter index (SLN-SPI) table, and a key storage database (KSD) are shown in FIGS. 2A, 2B, 2C, 2D, and 2E respectively.

Shown in FIG. 2A, the security policy database (SPD) permits the system operator to specify a policy for how data packets should be processed for each data packet communicated from a first IPsec endpoint or a source, e.g. 104 to a second IPsec endpoint or a destination, e.g. 106. In one embodiment, the SPD comprises entries for a source address, a destination address, and a policy for processing the data packets communicated in the encrypted communications system. As shown in FIG. 2A, a data packet having a source address of A1 and a destination address of A2 will be processed according to a policy termed PROCESS to protect (and similarly unprotect) the data packets using IPsec encryption and/or authentication according to the processes shown in FIGS. 4 and 7.

Figure 4:
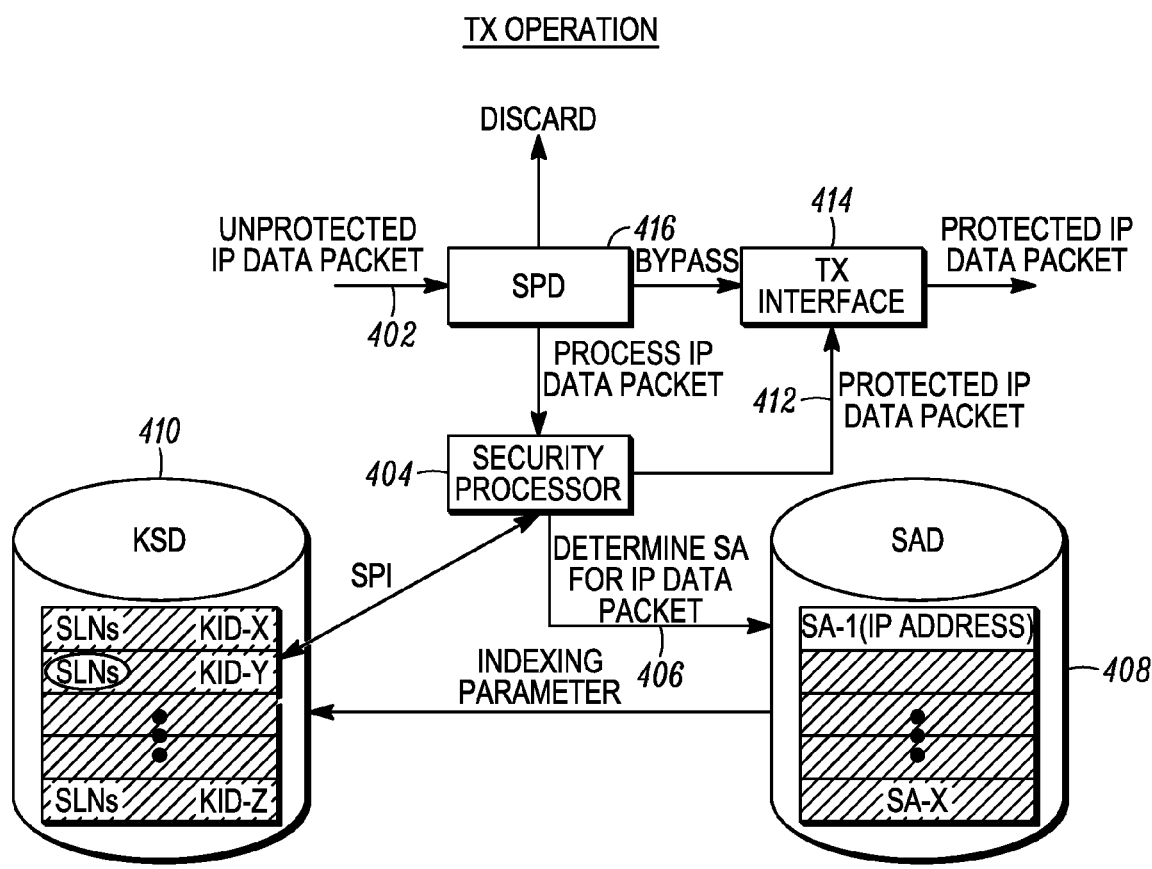
FIG. 4 is a block diagram illustrating details of an operation of a transmitter in accordance with some embodiments of the present invention.
Figure 7:
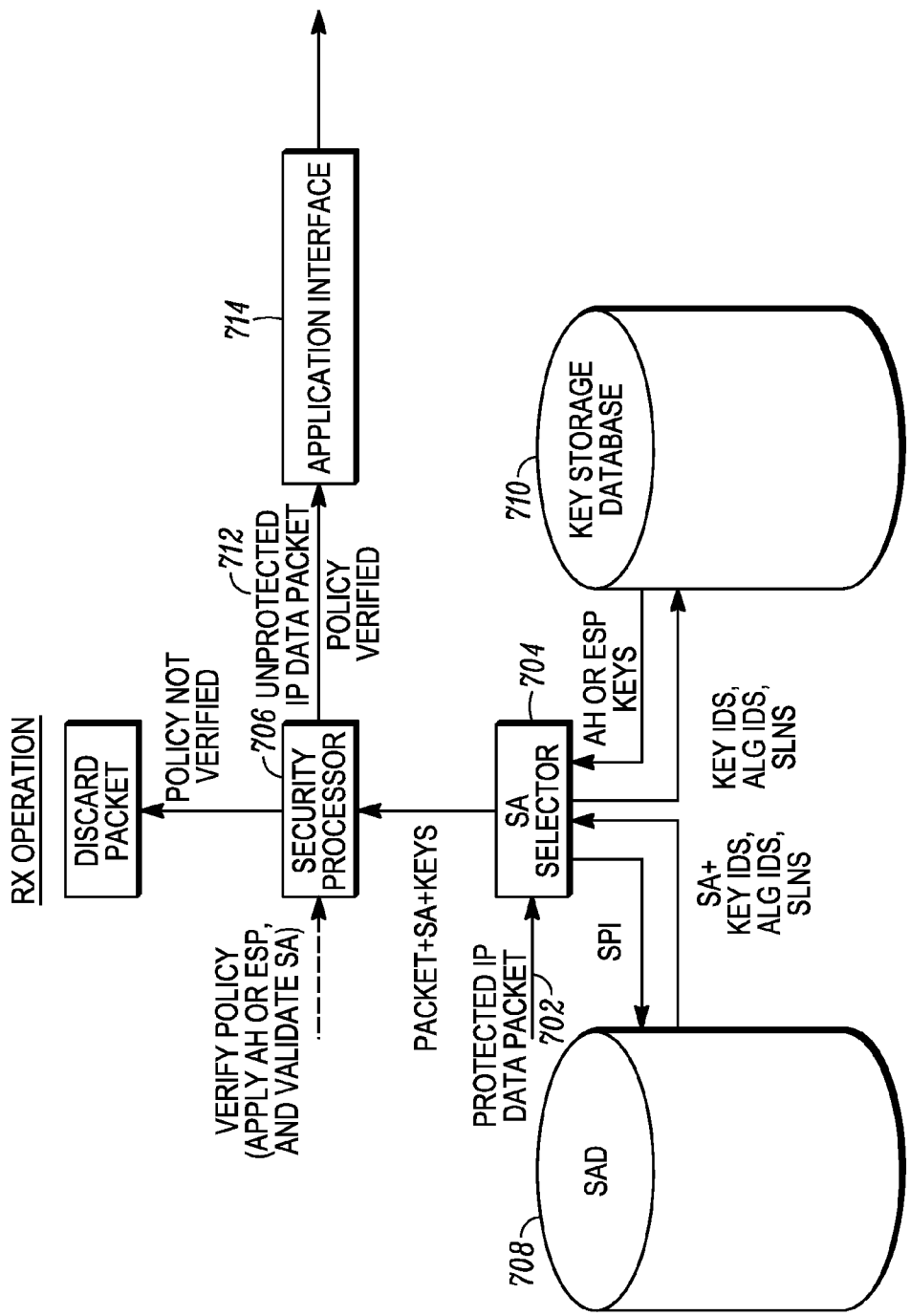
FIG. 7 is a block diagram illustrating details of an alternate operation of a receiver in accordance with some embodiments of the present invention.

For any data packet processed in the encrypted communications system 100, three processing choices are possible: DISCARD, BYPASS IPsec, and PROCESS using IPsec. DISCARD refers to the data packet being rejected. A data packet may be rejected because there is an invalid pair of source and destination addresses or invalid port addresses. BYPASS IPsec refers to a data packet transmitted or received without IPsec protection. For example, if encrypted communications are not necessary, then the data packet is not processed for encryption or authentication. PROCESS using IPsec refers to processing a data packet using IPsec encryption and/or authentication, e.g. according to the processes shown in FIG. 4 (unprotected to protected processing) and FIG. 7 (protected to unprotected processing). In the example of FIGS. 4 and 7, PROCESS using IPsec means to perform encapsulation security protocol (ESP) processing. Although not shown, in another example, PROCESS using IPsec means to perform authentication header (AH) protocol processing.

Determining the policy for how to process data packets in the encrypted communications system is performed by using a selector or a number of selectors. As used herein, a selector is information identifying an IPsec endpoint. Examples of a selector include an IP address, a port number, and other similar identifying information. In the embodiment of FIG. 2A, a source address, e.g. a source IP address, and a destination address, e.g. a destination IP address, are the selectors used to determine the policy used to process data packets between a pair of IPsec endpoints.

Shown in FIG. 2B, the security association database (SAD) specifies security associations for each data packet communicated from a first IPsec endpoint or a source, e.g. 104 to a second IPsec endpoint or a destination, e.g. 106. As used herein, a security association (SA) comprises information defining secure communications between the first IPsec endpoint and the second IPsec endpoint. For example, the SA comprises SA parameters necessary to effectuate the PROCESS policy, e.g. ESP processing, for a given source and destination. As shown in FIG. 2B, each row in the SAD is termed a SA. Examples of SA parameters comprise IP addresses of the source and the destination, port addresses of the source and destination, and a mode. In one embodiment, a SA is defined in RFC 4301.

The SAD may also include an entry for a security parameter index (SPI). SPI can be used to indicate keyIDs to locate an active key location in the KSD. The SPI consists of the combination of an encryption key's keyID and an authentication key's keyID. As shown in FIG. 2B, for security association SA1, the SPI is a combination of the encryption key's keyID 21 and the authentication key's keyID 42. In one embodiment, the SPI could be a concatenation of the encryption keyID and the authentication keyID.

Similarly, the SAD may also include an entry for an indexing parameter which relates a SA in the SAD with a key in the KSD. Relating a SA to a key may be performed by indexing parameters such as a $SPI_s$, or a SA reference number. In one embodiment, as shown in FIG. 2B, the indexing parameter used is termed a secondary security parameter index ($SPI_s$). In such an example, for a data packet having a source address of A1 and a destination address of A2, security association SA1 relates to keys in a KSD via the indexing parameter $SPI_s$, namely SLN2 and SLN4. In such an embodiment, the SPIs comprises at least one SLN which identifies an entry in a Key Storage Database (KSD). The SLN is a specific indexing parameter that relates a SA from the SAD with keys in the KSD. In one embodiment, where ESP processing is implemented, the $SPI_s$ comprises two SLNs. One SLN is used for encryption and the second SLN is used for authentication. For the example of FIG. 2B, SLN2 is used for encryption and SLN4 is used for authentication. In an example, where AH protocol processing is implemented, only one SLN is necessary, e.g. for authentication.

In another embodiment, relating a SA in the SAD to a key in the KSD can also be determined by using a SA-SLN table and a SLN-SPI table. Shown in FIG. 2C, the SA-SLN table relates a SA with a SLN. Shown in FIG. 2D, the SLN-SPI table relates a SLN, e.g. from the SA-SLN table, to a SPI. The SLN-SPI table also contains information necessary to identify keys. As such, shown in FIG. 2D is information such as keyIDs and algorithm IDs (algIDs). Even though shown in FIGS. 2C and 2D is illustration of one key, alternative embodiments contemplate utilizing SA-SLN and SLN-SPI tables to translate to multiple keys, e.g. encryption and authentication keys, in the KSD.

Regardless of the implementation of relating a SA to a key in the KSD, e.g. via a) the SAD in FIG. 2B or b) the SA-SLN table in FIG. 2C and the SLN-SPI table in FIG. 2D, populating these tables is performed by the KMF sending a modified OTAR key assignment message so that the OTAR key assignment message communicates keys to the IPsec endpoint. For example, the KMF 102 populates the SLN-SPI table shown at FIG. 2D by assigning a random number to a SPI and sending the SPI in the modified OTAR key assignment message to the IPsec endpoint. In another example, populating these tables is performed by locally configuring the IPsec endpoint, e.g. by a KVL.

The SAD may also include an entry for a mode that is used between a source, e.g. 104 to a destination, e.g. 106. Mode refers to the type of IPsec session between the source and destination. Examples of types include tunnel and transport. Shown in FIG. 2B, for a data packet having a source address of A1 and a destination address of A2, the mode used for the IPsec session is tunnel.

Shown in FIG. 2E, the key storage database (KSD) stores keys and key information needed for encryption and/or authentication of data packets. In one embodiment, the KSD comprises keysets indexed by SLNs. In another embodiment the keysets can be indexed by an indexing parameter such as a SA reference number. A plurality of keysets can be indexed by a single indexing parameter in the KSD. For example, as shown in FIG. 2E, SLN, indexes keyset1 and keyset2 having keyIDs 11 and 12 respectively.

Figure 3:
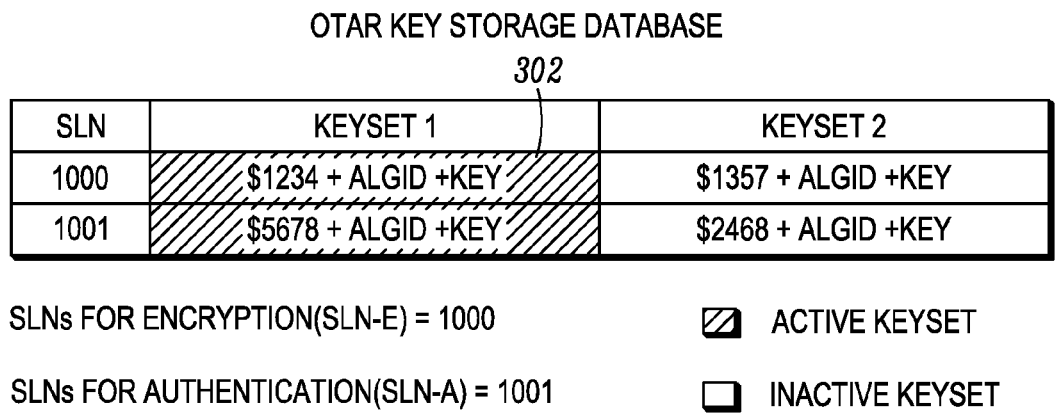
FIG. 3 illustrates an example of an OTAR key storage database in accordance some embodiments of the present invention.

FIG. 3 illustrates a specific example of FIG. 2E's KSD. Shown in FIG. 3 is an example KSD used in an OTAR system in accordance with some embodiments. In such an example, the KSD is defined by the OTAR protocol, e.g. in TIA 102.AACA and TIA102.AACB. Each key location, e.g. 302, in the OTAR KSD contains a key, a keyID, and an algID. In this example, SLN 1000 is used for encryption so the key locations referenced by SLN 1000 contain encryption keys and SLN 1001 is used for authentication so the key locations referenced by SLN 1001 contain authentication keys. In Project 25, for a given SLN, there may be up to 16 different keysets, although only two keysets are shown in FIG. 3. Even though there may be up to 16 different keysets for each SLN, only one keyset per SLN is active at any given time. At any time, the active key can be found by looking for an active keyset in the KSD. For example, as shown in FIG. 3, the active key for authentication, associated with SLN 1001 can be found in the KSD by using the keyID of $5678.

In the example of the OTAR KSD illustrated in FIG. 3, there is one key for encryption and one key for authentication. In such an embodiment, the two keys are not the same. However, in an alternate embodiment the KSD may comprise a single master key for each SA. The encryption key and the authentication key can be derived from the master key. One method for deriving the encryption key and the authentication key from a master key is defined in RFC 3711.

Those skilled in the art, however, will recognize and appreciate that the specifics of the example databases shown in FIGS. 2 and 3 are merely illustrative of some embodiments and that the teachings set forth herein are applicable in a variety of alternative settings. For example, since the teachings described do not depend on the specific types and/or values of the indexing parameter(s), addresses, and/or key locations, the teachings can be applied to other embodiments. As such, other alternative implementations of using different types and/or values of the indexing parameter(s), addresses, and/or key locations are contemplated and are within the scope of the various teachings described.

Figure 8:
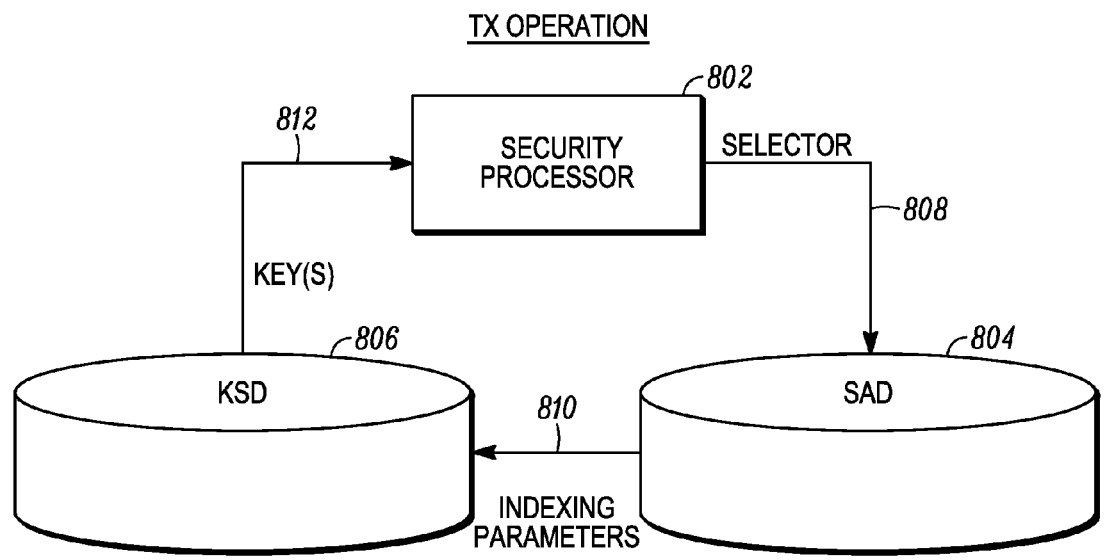
FIG. 8 is a block diagram illustrating the high level operation of a transmitter in accordance with some embodiments of the present invention.

Turning now to FIG. 8, a block diagram illustrating the high level operation of a transmitter in accordance with some embodiments is shown and illustrated. As shown in FIG. 8, the transmitter comprises a security processor 802, a SAD 804, and a KSD 806. In operation, an unprotected data packet is received by the transmitter, e.g. by a SPD of the transmitter as shown in FIG. 2A. As used herein, unprotected means that the unprotected data packet is a data packet without any encryption or security.

If the data packet should be processed, the security processor 802 searches the SAD 804 to select a security association by using a selector 808. Based upon the selected security association, an indexing parameter 810 is determined. The security processor 802 determines an active key location from the KSD 806 using the indexing parameter. Based upon a key 812 from the active key location, the security processor 802 encrypts the unprotected data packet. The security processor 802 formulates a security parameter index (SPI) in the header of the encrypted data packet by using a keyID from the active key location. Finally, the encrypted data packet is transmitted with the header indicating the SPI.

Turning now to FIG. 4, a block diagram illustrating further details of an operation of a transmitter is shown and illustrated, when an unprotected IP data packet needs to be processed to become a protected IP data packet so that it can be sent by an IPsec endpoint, e.g. 104, the processing shown in FIG. 4 takes place. To perform the processing, a security processor 404 utilizes a KSD 410, a SAD 408, a SPD 416, and a TX interface 414 to implement secure communications for data packets in the encrypted communications system.

An unprotected data packet 402 enters the security policy database (SPD) 416. As discussed previously, one embodiment of the SPD 416 is shown in FIG. 2A. The unprotected data packet 402 is a data packet without any encryption or security provision. The SPD 416 determines a policy for processing the unprotected data packet 402 using a source address and destination address as selectors. If the unprotected data packet 402 should be processed, e.g. if the source and destination addresses of the unprotected data packet 402 match with the addresses of the source and destination IPsec endpoints, then the SPD 416 will process or bypass the unprotected data packet. Otherwise, the SPD 416 will discard the unprotected data packet. If the unprotected data packet should be processed, then the security processor 404 applies a security protocol. The security processor 404 may apply either ESP or AH protocol. In one embodiment, the security processor 404 conforms to ESP. In any case, the security processor 404 performs the mapping between the KSD 410 and the SAD 408 by associating an indexing parameter in the KSD, e.g. as shown in FIG. 3, SLN 1000, to an SLN via a SA in the SAD. As mentioned above, in an alternate embodiment $SPI_s$ can be used as the indexing parameter to indicate the SLNs in the KSD.

Regardless of the indexing parameter used, the mapping between SLNs and security associations is the same at the first IPsec endpoint 104 and the second IPsec endpoint 106. Also, whether at the first IPsec endpoint 104 or the second IPsec endpoint 106, outbound processing is performed as shown in FIG. 4. For example, if the first IPsec endpoint 104 sends a message to the second IPsec endpoint 106, then the first IPsec endpoint 104 functions as a transmitter and the second IPsec endpoint 106 functions as a receiver. Similarly, if the second IPsec endpoint 106 sends a message to the first IPsec endpoint 104, then the second IPsec endpoint 106 functions as a transmitter and the first IPsec endpoint 104 functions as a receiver.

The security processor 404 also determines 406 the type of SA for the unprotected data packet 402. In one embodiment, this determination is performed by referring to the SAD 408 with the source and destination IP addresses as selectors for the SAD 408. One embodiment of the SAD 408 is shown in FIG. 2B. The security processor 404 extracts an indexing parameter from the SAD 408 by using the determined SA. An indexing parameter gives the security processor 404 knowledge of the SLNs. The determined indexing parameter could be a secondary SPI or a SA reference number. Knowledge of SLNs enables the security processor 404 to search for an active key location in the KSD 410.

In one embodiment, the security processor 404 determines an active key location associated with the determined SLNs and uses the key and keyID found within the active key location for encryption of the unprotected data packet 402. The security processor 404 forms the SPI from the authentication keyID and the encryption keyID from the active key location. In one embodiment, forming the SPI comprises concatenation of the keyID for the authentication key with the keyID for the encryption key or vice versa. The formed SPI is added to an ESP header of the data packet.

Figure 5:
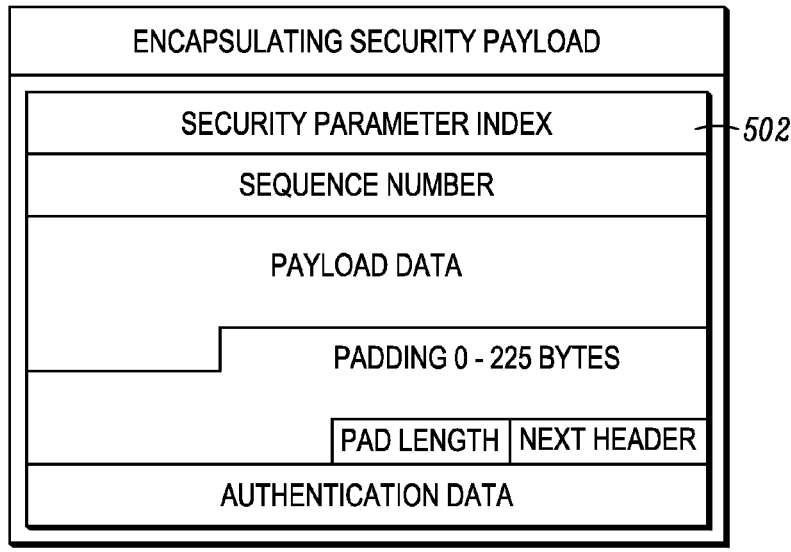
FIG. 5 illustrates an example of an encapsulation security protocol (ESP) header format in accordance with some embodiments of the present invention.

FIG. 5 illustrates an example of an ESP header. The ESP header comprises a SPI 502, a sequence number, payload data, authentication data, and the like. The SPI 502 in the header is used to communicate information related to keyIDs of the active keys. For example, the 32 bit IPsec SPI in the ESP header is a concatenation of a 16 bit authentication keyID and a 16 bit encryption keyID.

Figure 6:
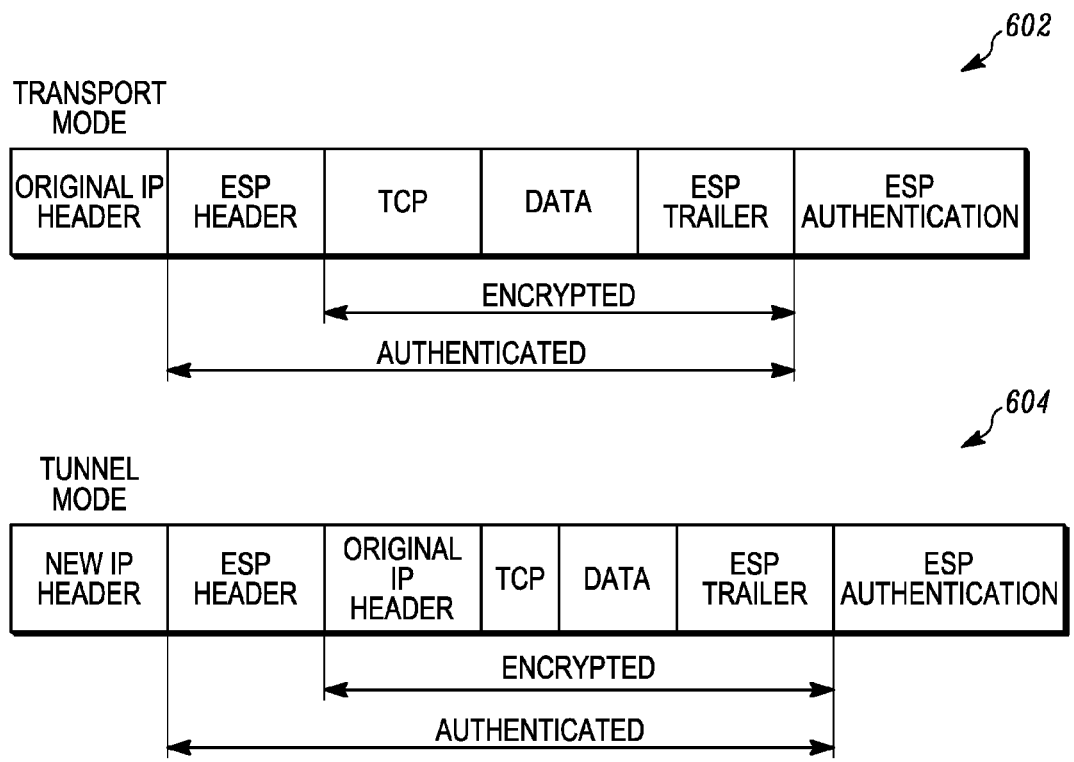
FIG. 6 illustrates the modes for communicating a data packet.

In one embodiment, the security processor 404 may also authenticate the encrypted data packet using the active key for authentication to create a protected data packet 412. The protected data packet 412 is then forwarded to a transmitter interface 414. FIG. 6 shows examples of the protected data packet 412 in accordance with some embodiments. The protected data packet 412 may be created for transport mode or tunnel mode. If the protected data packet is created for transport mode, then the unprotected data packet is encrypted and authenticated as shown in data packet 602. If the protected data packet is created for tunnel mode, then the unprotected data packet is encrypted and authenticated as shown in data packet 604. Determining how to create the protected data packet is found by referring to the mode in the SAD, e.g. mode 202 as shown in FIG. 2B. Continuing with this example, for a data packet having a source address of A1 and a destination address of A2, the data packet will be created for tunnel mode.

Figure 9:
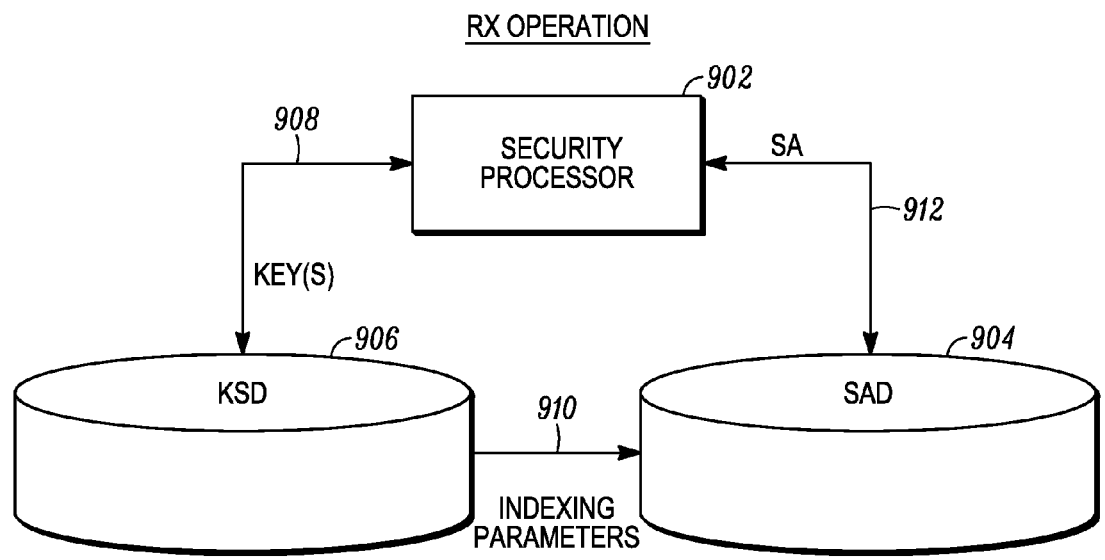
FIG. 9 is a block diagram illustrating the high level operation of a receiver in accordance with some embodiments of the present invention.

Turning now to FIG. 9, a block diagram illustrating the high level operation of a receiver in accordance with some embodiments is shown and illustrated. As shown in FIG. 9 the receiver comprises a KSD 906, and a SAD 904, and a security processor 902. In operation, a protected data packet is received by the receiver, e.g. a SA selector of the receiver as shown in FIG. 7. As used herein, protected means that the protected data packet is a data packet with encryption or some security provision.

The security processor 902, processes an incoming data packet in the receiver. For example, the security processor 902 decapsulates the header of the incoming data packet to extract the SPI. Based on the extracted SPI, the security processor 902 determines a keyID or keyIDs, where the keyID or keyIDs are associated with encryption and/or authentication keys. The security processor 902 determines a processing key or processing keys 908 by searching in the KSD 906 for a key location (regardless of whether the key location is active or not) using the determined keyIDs. The security processor 902 also extracts an indexing parameter 910 associated with the key location from the KSD 906. As described above, the extracted indexing parameter could be a $SPI_s$, or a SA reference number. The security processor 902 determines a SA 912 by matching the extracted indexing parameter with the indexing parameters in the SAD 904. The security processor 902 authenticates and/or decrypts the received data packet using the processing keys. Finally, the security processor 902 verifies a policy by matching the selectors from the decrypted packet with the determined SA.

Turning now to FIG. 7, a block diagram illustrating details of an alternate operation of a receiver is shown and illustrated. When a protected IP data packet needs to be processed to become an unprotected IP data packet so that it can be received by an IPsec endpoint, e.g. 106, the processing shown in FIG. 7 takes place. To perform the processing, a security processor 706 utilizes a SA selector 704, a SAD 708, a KSD 710, and an application interface 714 to implement secure communications for data packets in the encrypted communications system.

A protected IP data packet 702 (e.g. with encryption or security) enters the SA selector 704 where the SA selector 704 decapsulates a header of the protected IP data packet 702 to extract a SPI, e.g. 502 as shown in FIG. 5. In one embodiment, the SPI comprises concatenation of the keyID for the authentication key with the keyID for the encryption key or vice versa. Based upon the SPI, the SA selector 704 is able to select a SA from the SAD 708.

In one embodiment, the SAD 708 of the receiver, e.g. second IPsec endpoint 106 is the same as the SAD 408 of the transmitter, e.g. first IPsec endpoint 104. However, in another embodiment the SAD 708 of the transmitter and SAD 408 of the receiver could be different, e.g. as described in RFC 4301. Also, whether at the first IPsec endpoint 104 or the second IPsec endpoint 106, inbound processing is performed as shown in FIG. 7. For example, if the first IPsec endpoint 104 receives a message from the second IPsec endpoint 106, then the first IPsec endpoint 104 functions as a receiver and the second IPsec endpoint 106 functions as a transmitter. Similarly, if the second IPsec endpoint 106 receives a message from the first IPsec endpoint 104, then the second IPsec endpoint 106 functions as a receiver and the first IPsec endpoint 104 functions as a transmitter.

The SA selector 704 uses the selected SA to extract an indexing parameter, such as a secondary SPI ($SPI_s$) or a SA reference number, from the SAD 708. As mentioned above, the indexing parameter comprises information necessary to relate the SA in the SAD to the keys in the KSD 710. As mentioned above, the indexing parameter and SPI are used to determine the key locations (whether active or not) in the KSD 710. In another embodiment, keyID's and/or algID's derived from the SPI along with the indexing parameter are used for searching a key location in KSD 710. Once a key location is determined in the KSD 710, keys for authentication and encryption, e.g. adhering to ESP or AH protocol, are extracted by the SA selector 704. The SA selector 704 then passes the protected IP data packet, the SA, and the keys for the protected IP data packet to the security processor 706.

The security processor 706 uses the keys for authentication and decryption to process the protected IP data packet to yield an unprotected IP data packet 712. In one embodiment, the security processor 706 first authenticates the protected IP data packet and then decrypts it. Because the protected IP data packet 702 has become decrypted, the security processor 706 is able to confirm whether the IP addresses in the data packet are appropriate for further processing by verifying the security policy. In one embodiment, the selectors from the unprotected data packet 712 are used to determine whether the unprotected IP data packet 712 should be further processed, e.g. passed to an application interface 714. If the selectors match the selected SA, then the unprotected IP data packet 712 is further processed and forwarded to the application interface 714. If the selectors do not match the SA, the IP data packet is discarded.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:
1. A method for encrypted communications comprising:
configuring at least one processor to perform the steps of:
receiving an unprotected data packet;
selecting a security association (SA) for the unprotected data packet from a security association database (SAD) by using a selector that identifies at least one endpoint device;
determining an indexing parameter from the SA, which relates the SA in the SAD with a key in a key storage database (KSD), wherein the key enables encryption of a data packet;

determining an active key location from the KSD using the indexing parameter;

encrypting the unprotected data packet using a key from the active key location to generate an encrypted data packet;

forming a security parameter index (SPI) in a header of the encrypted data packet by using a key identifier (KeyID) from the active key location; and transmitting the encrypted data packet with the header indicating the SPI to a receiver.

2. The method of claim 1 further comprising receiving at least one of a) a key or b) the SPI from a key management facility (KMF).

3. The method of claim 1, wherein the SPI is a random number.

4. The method of claim 1 wherein the selector comprises at least one of an IP address, a port number, or a range of IP addresses.

5. The method of claim 1, wherein the indexing parameter is at least one of a secondary security parameter index (SPIs) or a SA reference number.

6. The method of claim 1, further comprising determining a policy from a security policy database (SPD) using a source address and a destination address of the unprotected data packet before selecting the SA.

7. The method of claim 1, wherein forming the SPI comprises concatenating a keyID for an authentication key and a keyID for an encryption key from the active key location.

8. The method of claim 1 further comprising authenticating the encrypted data packet before transmitting the encrypted data packet.

9. The method of claim 1 wherein the key from the active key location is a master key used for deriving an encryption key and an authentication key.

10. A method for decrypting encrypted communications comprising:

configuring at least one processor to perform the steps of:
receiving a protected data packet from a transmitter;
selecting a security association (SA) for the protected data packet from a security association database (SAD) using a security parameter index (SPI) included in the protected data packet;
extracting an indexing parameter linked with the selected SA, wherein the indexing parameter relates the selected SA in the SAD with a key in a key storage database (KSD), wherein the key enables decryption of a data packet;
extracting processing keys by searching for a key location in the KSD using the indexing parameter and a keyID derived from the SPI;
decrypting the protected data packet using the processing keys to generate a decrypted data packet; and
verifying a policy by matching a selector in the decrypted data packet with the selected SA, wherein the selector identifies at least one endpoint device.

11. The method of claim 10 further comprising receiving at least one of a) a key or b) the SPI from a key management facility (KMF).

12. The method of claim 10, wherein the selectors comprise at least one of an IP address, a port number, or a range of IP addresses.

13. The method of claim 10, wherein the indexing parameter is at least one of a secondary security parameter index (SPI$_S$), or a SA reference number.

14. The method of claim 10, wherein the SPI comprises a concatenation of a keyID for an authentication key and a keyID for an encryption key from the key location.

15. The method of claim 10 further comprising authenticating the protected data packet using the processing keys before decryption.

16. A method for decrypting encrypted communications comprising:

configuring at least one processor to perform the steps of:
receiving a protected data packet from a transmitter;
extracting a security parameter index (SPI) from a header of the protected data packet;
determining a keyID from the extracted SPI;
determining a processing key by searching for a key location in a key storage database (KSD) using the determined keyID;
extracting an indexing parameter associated with the key location from the KSD;
determining a security association (SA) by matching the indexing parameter from the KSD with indexing parameters in a security association database (SAD);
decrypting the protected data packet using the processing key to generate a decryption data packet;
verifying a policy by matching selectors in the decrypted data packet with the SA, wherein the selectors identify at least one endpoint device.

17. The method of claim 16, wherein the indexing parameter is at least one of a secondary security parameter index (SPI$_S$) or a SA reference number.

18. The method of claim 16 further comprising receiving at least one of a) a key or b) the SPI from a key management facility (KMF).

19. The method of claim 16, wherein the processing key comprises a master key used for deriving an authentication key and an encryption key.

20. The method of claim 16, wherein the selectors comprise at least one of an IP address, a port number, or a range of IP addresses.

* * * * *

UNITED STATES PATENT AND TRADEMARK OFFICE
CERTIFICATE OF CORRECTION

PATENT NO.         : 8,059,817 B2
APPLICATION NO.    : 11/765085
DATED              : November 15, 2011
INVENTOR(S)        : Kruegel et al.

It is certified that error appears in the above-identified patent and that said Letters Patent is hereby corrected as shown below:

In Column 6, Line 22, delete "SPIs" and insert -- $SPI_s$ --, therefor.

In Column 7, Line 4, delete "SLN," and insert -- $SLN_1$ --, therefor.

In Column 11, Line 20, in Claim 5, delete "(SPIs)" and insert -- $SPI_s$ --, therefor.

Signed and Sealed this
Eighteenth Day of December, 2012

David J. Kappos
*Director of the United States Patent and Trademark Office*